P. E. NAHRUNG.
SECTIONAL NUT.
APPLICATION FILED DEC. 27, 1919.
1,366,884. Patented Jan. 25, 1921.
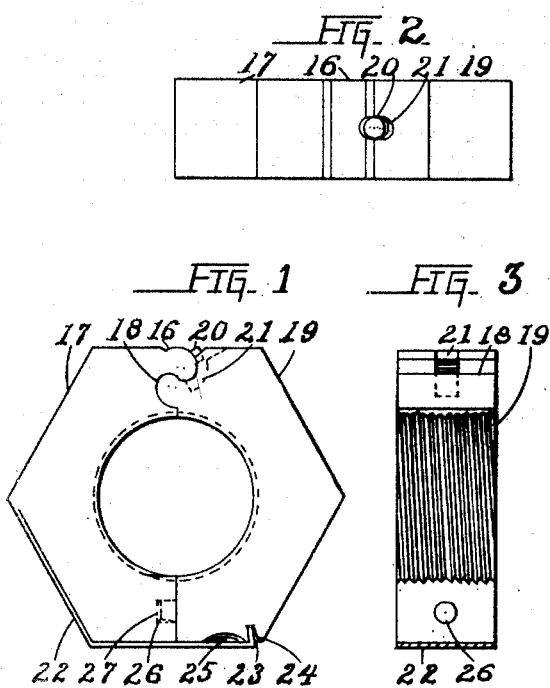

UNITED STATES PATENT OFFICE.

PHILIP E. NAHRUNG, OF ST. JOSEPH, MISSOURI.

SECTIONAL NUT.

1,366,884.  Specification of Letters Patent.  Patented Jan. 25, 1921.

Application filed December 27, 1919. Serial No. 347,817.

*To all whom it may concern:*

Be it known that I, PHILIP E. NAHRUNG, a citizen of the United States, residing at St. Joseph, in the county of Buchanan and State of Missouri, have invented certain new and useful Improvements in Sectional Nuts, of which the following is a specification, reference being had therein to the accompanying drawing.

Figure 1 is an end view of the nut. Fig. 2 is a top edge view of the nut seen in Fig. 1. Fig. 3 is an internal view of one of the sections of the nut, seen in Fig. 1, looking toward the right, the spring being shown in section across the bottom.

Referring to Fig. 1, the hinge hook 16 is formed on the nut section 17. Said hook is slid into engagement with the hook 18, which is formed with a nut section 19. After this, the stud 20 is screwed into a screw threaded aperture, which is formed in the first mentioned hook. Said stud is oscillated in the channel 21 when said nut sections are oscillated from each other, as hereinafter described. Said channel is formed in the nut section 19, which, together with the described hooks, holds said nut sections against separation and also holds said hinge hooks in register with each other.

The left end portion of the spring 22 is secured on the nut section 17, by rivets, not shown, but might be secured thereon in any other substantial manner, known to the machinists' art.

The hook 23 is formed on the free end of said spring 22, and is in engagement with the slot 24, which is formed in the outer corner of the free end of the nut section 19.

The chamfers 25 are formed on the last mentioned section, for permitting the use of the thumb and index-finger nails in removing said hook from said slot. The register pin 26 (see Figs. 3 and 1,) is formed on the face of the nut section 19, and is inserted in the indicated aperture 27, which is formed in the adjacent face of the nut section 17, for holding said faces in register with each other.

In operation, the operator of the nut inserts his thumb and index-finger nails in the spaces formed by the chamfers 25, and thereby pulls on the free end portion of the spring 22, which moves the therewith formed hook 23 from the slot 24, after which he oscillates the thus freed ends of said nut sections from each other a sufficient distance to permit said sections to be placed on a threaded tube or bolt, not shown. He then releases the spring and manually presses the nut sections 17 and 19 against said tube, into threaded engagement therewith. At this juncture the elasticity of said spring 22 snaps its hook 23 into the slot 24, thereby securing the described nut on said tube. Said operator then applies a wrench to said nut and thereby turns the latter, until said nut is screwed to the desired point on said tube, after which he removes said wrench.

In removing the nut from said tube said operator first applies the wrench to said nut, and thereby rotates the latter in the opposite direction, in order to unseat the nut from the object on which it may be seated, after which he removes the wrench from the nut, and releases the snap hooked ends of the nut sections as previously described. Said operator then oscillates the free ends of said nut sections from each other and thereafter removes the described nut from said tube.

Having fully described my invention, what I claim as new and desire to secure by Letters Patent, is:

A sectional nut comprising: a pair of screw threaded nut sections; a hinge hook formed on each one of said sections said hooks being adapted to hook together for forming a hinge one of said sections having a channel formed therein adjacent to its hinge hook and a slot formed in the portion thereof which is opposite to said hook; chamfers formed on said section adjacent to said slot; a stud secured in the hook of the opposite section and extending into the channel of the first mentioned section for holding said sections against detachment from each other and for holding said hinge hooks in register; a spring one end of which is secured on said opposite section; the first mentioned section having a slot formed therein adjacent to the free end of said spring; and a hook formed on the free end of said spring said hook being inserted in said slot, for detachably holding the hooked edge portions of said nut sections together.

In testimony whereof I affix my signature.

PHILIP E. NAHRUNG.